(12) United States Patent
Choi et al.

(10) Patent No.: US 8,117,328 B2
(45) Date of Patent: Feb. 14, 2012

(54) SYSTEM AND METHOD FOR AUTOMATICALLY RECOVERING FROM FAILED NETWORK CONNECTIONS IN STREAMING MEDIA SCENARIOS

(75) Inventors: Yejin Choi, Ithaca, NY (US); Alexandre Grigorovitch, Redmond, WA (US); Troy Batterberry, Kirkland, WA (US); Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1437 days.

(21) Appl. No.: 10/179,583

(22) Filed: Jun. 25, 2002

(65) Prior Publication Data

US 2003/0236905 A1    Dec. 25, 2003

(51) Int. Cl.
*G06F 15/16* (2006.01)
*G06F 15/173* (2006.01)

(52) U.S. Cl. ........ 709/231; 709/219; 709/223; 709/224; 709/225; 709/226; 709/227; 709/228; 709/229; 709/230; 717/173; 717/174; 717/175; 717/176; 717/177; 717/178; 714/2; 714/18; 714/48; 725/93; 725/94; 725/105; 725/143; 725/144; 725/145; 725/146; 725/147; 725/148; 725/149; 725/150; 725/151; 725/152; 725/153

(58) Field of Classification Search .................. 709/219, 709/223, 225–231; 714/2, 18, 48; 725/93–94; 725/105, 143–153; 717/173–178
See application file for complete search history.

(56) References Cited

U.S. PATENT DOCUMENTS

| | | | | |
|---|---|---|---|---|
| 5,826,027 A | * | 10/1998 | Pedersen et al. | 709/221 |
| 5,835,724 A | * | 11/1998 | Smith | 709/227 |
| 5,918,228 A | * | 6/1999 | Rich et al. | 707/10 |
| 5,928,330 A | * | 7/1999 | Goetz et al. | 709/231 |
| 5,966,120 A | * | 10/1999 | Arazi et al. | 715/724 |
| 5,987,501 A | * | 11/1999 | Hamilton et al. | 709/203 |
| 5,991,760 A | * | 11/1999 | Gauvin et al. | 1/1 |
| 6,006,266 A | * | 12/1999 | Murphy et al. | 709/227 |
| 6,041,345 A | | 3/2000 | Levi et al. | |
| 6,061,686 A | * | 5/2000 | Gauvin et al. | 707/624 |
| 6,070,184 A | | 5/2000 | Blount et al. | |
| 6,085,247 A | | 7/2000 | Parsons, Jr. et al. | |
| 6,115,740 A | * | 9/2000 | Mizutani | 709/217 |
| 6,134,243 A | * | 10/2000 | Jones et al. | 370/465 |
| 6,138,147 A | * | 10/2000 | Weaver et al. | 709/206 |
| 6,173,311 B1 | * | 1/2001 | Hassett et al. | 709/202 |
| 6,195,680 B1 | * | 2/2001 | Goldszmidt et al. | 709/203 |
| 6,205,140 B1 | * | 3/2001 | Putzolu et al. | 370/389 |

(Continued)

OTHER PUBLICATIONS

Karrer et al., "Dynamic Handoff of Multimedia Streams," 11th International Workshop on Network and Operating Systems Support for Digital Audio and Video, 2001, pp. 125-133, ACM Press, New York, U.S.A.

(Continued)

*Primary Examiner* — John Follansbee
*Assistant Examiner* — Saket K Daftuar
(74) *Attorney, Agent, or Firm* — Merchant & Gould P.C.

(57) ABSTRACT

Automatically recovering from broken network connections in streaming media scenarios. Server software executing on the server communicates with client software executing on the client during the streaming media session. If the streaming media session is interrupted, the server software and the client software exchange messages to associate the client with a client state stored by the server and to re-synchronize playback of the content.

18 Claims, 7 Drawing Sheets

U.S. PATENT DOCUMENTS

| | | | |
|---|---|---|---|
| 6,223,289 B1* | 4/2001 | Wall et al. | 713/201 |
| 6,349,337 B1 | 2/2002 | Parsons, Jr. et al. | |
| 6,351,772 B1* | 2/2002 | Murphy et al. | 709/227 |
| 6,377,996 B1* | 4/2002 | Lumelsky et al. | 709/231 |
| 6,453,355 B1* | 9/2002 | Jones et al. | 709/230 |
| 6,484,174 B1* | 11/2002 | Wall et al. | 707/9 |
| 6,496,942 B1* | 12/2002 | Schoenthal et al. | 714/4 |
| 6,512,778 B1* | 1/2003 | Jones et al. | 370/465 |
| 6,519,643 B1* | 2/2003 | Foulkes et al. | 709/227 |
| 6,564,255 B1* | 5/2003 | Mobini et al. | 709/219 |
| 6,578,070 B1* | 6/2003 | Weaver et al. | 709/206 |
| 6,665,726 B1* | 12/2003 | Leighton et al. | 709/231 |
| 6,751,673 B2* | 6/2004 | Shaw | 709/231 |
| 6,829,648 B1* | 12/2004 | Jones et al. | 709/230 |
| 6,857,130 B2* | 2/2005 | Srikantan et al. | 725/93 |
| 6,862,606 B1* | 3/2005 | Major et al. | 709/203 |
| 6,883,020 B1* | 4/2005 | Taranto et al. | 709/213 |
| 6,889,257 B1* | 5/2005 | Patel | 709/232 |
| 6,910,064 B1* | 6/2005 | Astarabadi et al. | 709/203 |
| 6,910,078 B1* | 6/2005 | Raman et al. | 709/231 |
| 7,054,935 B2* | 5/2006 | Farber et al. | 709/226 |
| 7,073,191 B2* | 7/2006 | Srikantan et al. | 725/87 |
| 7,120,695 B2* | 10/2006 | Nilsson et al. | 709/228 |
| 7,194,000 B2* | 3/2007 | Balachandran et al. | 370/395.42 |
| 7,272,651 B1* | 9/2007 | Bolding et al. | 709/227 |
| 7,330,880 B1* | 2/2008 | English | 709/219 |
| 7,680,875 B1* | 3/2010 | Shopiro et al. | 709/200 |
| 2002/0007402 A1* | 1/2002 | Huston et al. | 709/217 |
| 2002/0015403 A1* | 2/2002 | McConnell et al. | 370/352 |
| 2002/0064126 A1 | 5/2002 | Bhattal et al. | |
| 2002/0065918 A1* | 5/2002 | Shastri | 709/226 |
| 2002/0065922 A1* | 5/2002 | Shastri | 709/227 |
| 2002/0073205 A1* | 6/2002 | Mostafa | 709/227 |
| 2002/0077993 A1* | 6/2002 | Immonen et al. | 705/77 |
| 2002/0120760 A1* | 8/2002 | Kimchi et al. | 709/230 |
| 2002/0161911 A1* | 10/2002 | Pinckney et al. | 709/231 |
| 2003/0005139 A1* | 1/2003 | Colville et al. | 709/231 |
| 2003/0009452 A1* | 1/2003 | O'Rourke et al. | 707/3 |
| 2003/0028505 A1* | 2/2003 | O'Rourke et al. | 707/1 |
| 2003/0065810 A1* | 4/2003 | Ims et al. | 709/232 |
| 2003/0084179 A1* | 5/2003 | Kime et al. | 709/231 |
| 2003/0204602 A1* | 10/2003 | Hudson et al. | 709/228 |
| 2003/0233281 A1* | 12/2003 | Takeuchi et al. | 705/26 |
| 2003/0235196 A1* | 12/2003 | Balachandran et al. | 370/392 |
| 2004/0003064 A1* | 1/2004 | Astley et al. | 709/223 |
| 2006/0015574 A1* | 1/2006 | Seed et al. | 709/219 |

OTHER PUBLICATIONS

Mao et al., "Network Support for Mobile Multimedia Using a Self-adaptive Distributed Proxy," 11th International Workshop on Network and Operating Systems Support for Digital Audio and Video, 2001, pp. 107-116, ACM Press, New York, U.S.A.

Jing et al., "Client-server Computing in Mobile Environments," ACM Computing Surveys (CSUR), Jun. 1999, vol. 31, Issue 2, pp. 117-157, ACM Press, New York, U.S.A.

Bakre et al., "Reworking the RPC Paradigm for Mobile Clients," Mobile Networks and Applications, Dec. 1996, vol. 1, Issue 4, pp. 371-385, ACM Press, New York, U.S.A.

Handley et al., "SDP: Session Description Protocol," Network Working Group, Request for Comments: 2327, The Internet Society, Apr. 1998, 40 pages, U.S.A.

Schulzrinne et al., "Real Time Streaming Protocol (RTSP)," Network Working Group, Request for Comments: 2326, The Internet Society, Apr. 1998, 86 pages, U.S.A.

Schulzrinne et al., "RTP: A Transport Protocol for Real-Time Applications," Network Working Group, Request for Comments: 1889, Jan. 1996, 75 pages, U.S.A.

* cited by examiner

SYSTEM AND METHOD FOR AUTOMATICALLY RECOVERING FROM FAILED NETWORK CONNECTIONS IN STREAMING MEDIA SCENARIOS

TECHNICAL FIELD

The present invention relates to the field of streaming media. In particular, this invention relates to a system and method for automatically recovering from failed network connections in streaming media scenarios.

BACKGROUND OF THE INVENTION

Content streaming includes the streaming of audio, video, and/or text data from a network server to a client computer on an as-needed basis. The client computer renders the data as it is received from the network server. For example, audio, video, or audio/visual coverage of noteworthy events can be broadcast with streaming multimedia over a network such as the Internet as the events unfold. Similarly, television and radio stations can transmit live content over the network as streaming multimedia.

Streaming media over diverse networks poses a variety of technical challenges. The network connection between the server and the client is often subject to adverse conditions such as congestion, packet loss, varying latencies, IGMP/ICMP errors, rebooting routers or other networking devices, rebooting servers, inadvertent reset of TCP connections, lost modem connections, and temporarily unplugged network cables. Depending on the severity of the issue, some streaming media players encounter such adverse conditions and subsequently post a critical error to the user interface. The error is critical in that the user must manually intervene and re-establish the streaming session. Unfortunately, in the case of on-demand content, this also means the user must manually seek to the position in the content that was last being viewed, if seeking in the content is allowed, after the connection is re-established. Further, when this streaming link is disconnected, all the clients and servers that are downstream from the disrupted connection are terminated. The abnormal termination of all downstream clients can result in significant lost revenue.

For these reasons, a system for automatically recovering from a failed streaming media session is desired to address one or more of these and other disadvantages.

SUMMARY OF THE INVENTION

The invention includes a method of streaming media content from a server to at least one client. In particular, the invention includes server software executing on the server communicating with client software executing on the client. If the streaming is interrupted, the server software and the client software exchange messages to re-map a state of the client and re-synchronize playback of the content.

The invention addresses network problems experienced between the client(s) and the server. In addition, the invention addresses network problems experienced by server-to-server and encoder-to-server distribution scenarios, where the server is actually a client streaming from another source. The software of the invention allows a streaming media client player to automatically attempt to recover from a variety of connection problems with a server without user intervention. Furthermore, the invention software allows the client playing on-demand media to continue after re-connection at roughly the same point in the media program when the connection was lost. The client networking code uses the software of the invention to act upon unexpected errors that are not the direct action of an administrator. The invention includes software on both the server and the client as well as software for a protocol-specific implementation using real-time streaming protocol (RTSP) and hypertext transfer protocol (HTTP).

With the invention, servers can withstand longer network outages without terminating clients. The invention improves the end-user experience by preventing the user from having to manually recover from connectivity problems. The fault tolerant functionality improves the end user experience for streaming media by more closely mimicking other content delivery metaphors such as television, radio, video cassette recorders, digital versatile disk players, etc.

In accordance with one aspect of the invention, a method streams media content from a server to at least one client. The method includes establishing a streaming media connection between the server and the at least one client and streaming the media content from the server to the client. The method further includes receiving, by the client, the streamed media content from the server. The method includes sending a reconnect request from the client to the server if the streaming is interrupted. The method also includes receiving, by the server, the reconnect request from the client and re-establishing the streaming media connection with the client. The method includes continues with the server streaming the media content and the client receiving the streamed media content.

In accordance with another aspect of the invention, a method stream media content to at least one client. The method includes establishing a streaming media connection with at least one client and streaming the media content to the client. The method also includes receiving a reconnect request from the client if the streaming is interrupted. The method further includes re-establishing the streaming media connection with the client and continuing to stream the media content.

In accordance with yet another aspect of the invention, a method receives media content streamed from a server. The method includes establishing a streaming media connection with the server and receiving the media content streamed from the server. The method also includes transmitting a reconnect request to the server if the receiving is interrupted. The method further includes re-establishing the streaming media connection with the server and continuing to receive the streamed media content.

In accordance with yet another aspect of the invention, one or more computer-readable media having computer-executable components in a system wherein a server streams media content to at least one client. The components include a server component and at least one client component. The server component and the client component include computer-executable instructions for exchanging one or more messages to re-map the state of the client and to re-synchronize playback of the content if the streaming is interrupted.

In accordance with yet another aspect of the invention, one or more computer-readable media store a data structure representing a reconnect request transmitted by a client to a server to re-establish an interrupted streaming media session. The data structure includes a session identifier identifying the interrupted streaming media session and a stream identifier identifying a media stream streamed by the server to the client in the interrupted streaming media session.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
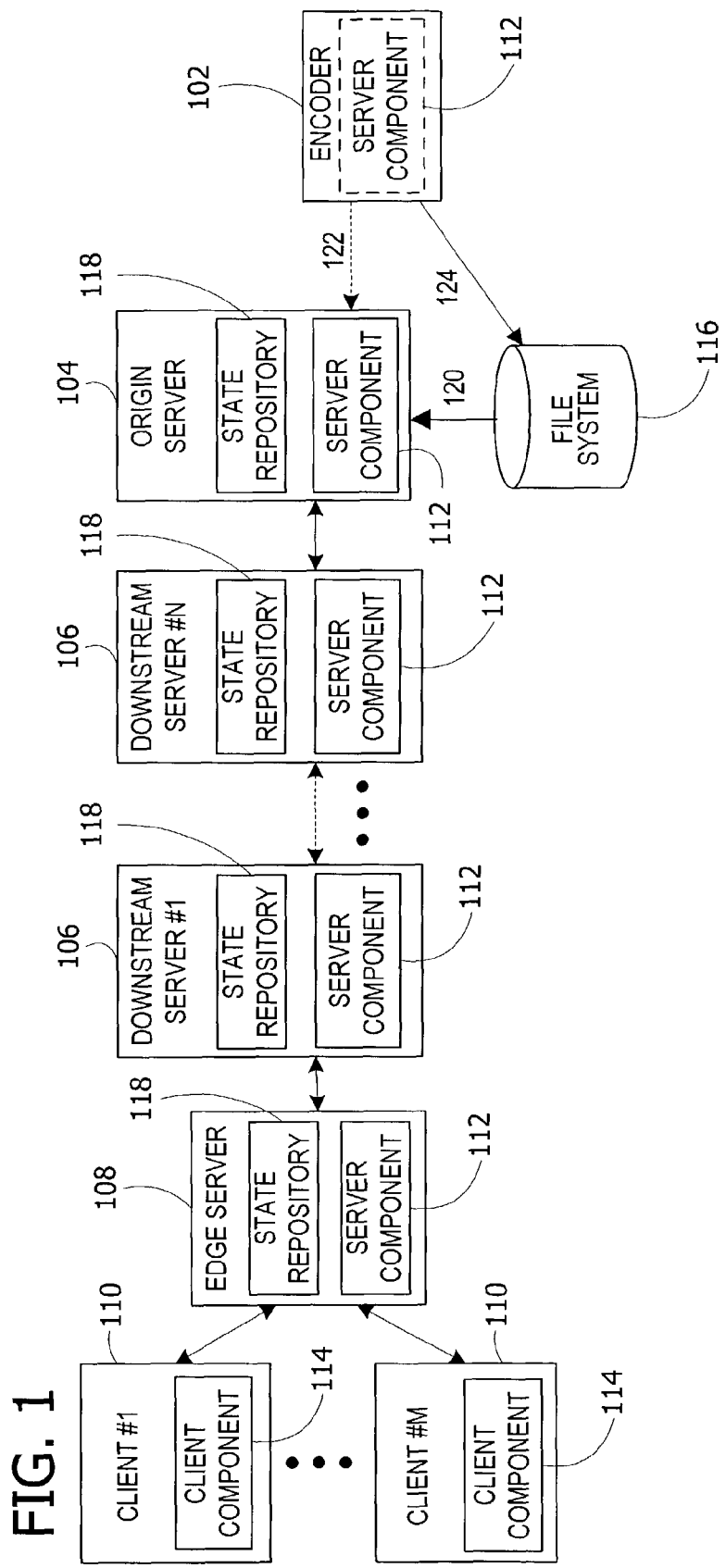
FIG. 1 is an exemplary block diagram illustrating a streaming media scenario.

Software of the invention provides a mechanism for automatically re-connecting a streaming server with a client if streaming is interrupted during a streaming media session as illustrated in FIG. 1. This invention includes software executing on both the client and one or more servers. In particular, the invention includes server software executing on the server communicating with client software executing on the client. If the streaming is interrupted, the server software and the client software exchange messages to re-map a state of the client and re-synchronize playback of the content.

Referring to FIG. 1, an exemplary block diagram illustrates a streaming media scenario. The invention software is operable in a system having an optional encoder 102, an origin server 104, one or more downstream servers 106 such as downstream server #1 through downstream server #N, an edge server 108, and one or more clients 110 such as client #1 through client #M. The origin server 104, the downstream servers 106, and the edge server 108 each execute a server software component 112 while the clients 110 execute a client software component 114. The server component 112 and the client component 114 include computer-executable instructions for exchanging one or more messages to re-map the state of the client 110 and to re-synchronize playback of the content if the streaming is interrupted. Separate state repositories 118 such as a state repository stored by the origin server 104, a state repository stored by the downstream servers 106, and a state repository stored by the edge server 108 store a state of the downstream server 106 or client 110. For example, the edge server 108 stores a state of the client 110. In addition, each of the downstream servers 106 and the origin server 104 store a state for downstream servers acting as clients. For example, the downstream server #1 stores a state of the edge server 108. Similarly, the origin server 104 stores a state of the downstream server #N.

The origin server 104 is the first server the content flows through on the way to the client 110. The origin server 104 generally receives content from either a file system 116 at 120 or a feed from the encoder 102 at 122. The encoder 102 stores the encoded content in the file system 116 at 124. If the origin server 104 receives content from the encoder 102, the file system 116 may be bypassed, or the encoded content may be concurrently stored in the file system 116 at 124. The downstream servers 106 generally receive data from the origin server 104. In complex distribution scenarios involving multiple levels of servers, the downstream servers 106 may receive and forward content from another server that is sourcing content from the origin server 104. Since the data flows from the origin server 104 to the client 110, a server is considered downstream from previous servers. The edge server 108 is generally the last server in a distribution scenario. The edge server 108 is downstream from all other servers in the distribution chain. The edge server 108 is intended to have direct client connections. For clarity and simplicity, the edge server 108 will be referred to herein as server 108, noting that the invention is operable with any configuration and/or number of servers 104, 106, 108.

In addition, the edge server 108 maintains a state repository storing a client viewer state of each of the clients 110 (e.g., storing logging statistics). The clients 110 transmit their states to the edge server 108 for storage. The state of each client 110 is maintained for a preset time period after a network failure or other interruption in the streaming.

In one embodiment, the origin server 104 streams the media content from the file system 116. In an alternative embodiment, the encoder 102 also executes the server component 112 to stream content to the origin server 104 as it is encoded. In such an embodiment, the file system 116 may be bypassed, or the encoded content may be concurrently stored in the file system 116. Those skilled in the art will appreciate that the invention is not limited to the exemplary block diagram of FIG. 1. Instead, it is contemplated by the inventors that the software of the invention is operable in various other client-server streaming media scenarios not specifically described herein.

The clients 110 may render or otherwise display or process the received content via a media player user interface (UI). Clients 110 receiving streamed media content for long periods of time often encounter a variety of network problems that result in the server-to-client connection or session being lost. With other systems, a lost connection requires user intervention to re-establish the link. With the software of the invention, the clients 110 and the servers 108 attempt to automatically reconnect. If the server 108 was streaming stored content (e.g., from a computer-readable medium) prior to the session failure, the client 110 can resume playback at the location in the stream when the failure occurred using statistics saved prior to the failure. If the server 108 was streaming live content (e.g., directly from the encoder 102) prior to the session failure, the client player UI may not receive and render the content that was streamed during the reconnection process. If the reconnection process occurred relatively quickly, the server 108 may have buffered a small amount of the live content, and will deliver that buffered content to the client 110 if reconnection is successful. As such, a user may experience minimal disruption in the playback.

In one embodiment, communication between the servers 108 and client 110 in FIG. 1 is implemented using a real-time streaming protocol (RTSP) and a session description protocol (SDP). RTSP, as described in the Internet Engineering Task Force (IETF) RFC 2326, the entire disclosure of which is incorporated herein by reference, is an application-level protocol for control of the delivery of data with real-time properties. RTSP provides an extensible framework to enable controlled, on-demand delivery of real-time data, such as audio and video. Sources of data can include both live data feeds and stored clips. This protocol is intended to control multiple data delivery sessions, provide a means for choosing delivery channels such as a user datagram protocol (UDP), a multicast UDP and a transmission control protocol, and provide a means for choosing delivery mechanisms based upon a real-time transport protocol.

For example, the Real-time Transport Protocol (RTP), as described in the IETF RFC 1889, the entire disclosure of which is incorporated herein by reference, provides end-to-end network transport functions suitable for applications transmitting real-time data, such as audio, video or simulation data, over multicast or unicast network services. RTP does not address resource reservation and does not guarantee quality-of-service for real-time services. The data transport is augmented by a control protocol (RTCP) to allow monitoring of the data delivery in a manner scalable to large multicast networks, and to provide minimal control and identification functionality. RTP and RTCP are designed to be independent of the underlying transport and network layers.

SDP, as described in the IETF RFC 2327, the entire disclosure of which is incorporated herein by reference, is an application level protocol intended for describing multimedia sessions for the purposes of session announcement, session invitation, and other forms of multimedia session initiation. SDP can be used in conjunction with RTSP to describe and negotiate properties of the multimedia session used for delivery of real-time data.

The invention software supports automatic reconnection logic 112, 114 for various protocols such as HTTP (see FIG. 6), RTSP (see FIG. 5), and any proprietary protocols in the client component 114 and the server component 112. The invention software also logs the first segment of information received following a successful reconnect (e.g., as a status code of 210). The invention software supports broadcast and on-demand modes of operation. The automatic reconnection logic 112, 114 can be tuned/disabled in the server 108 (e.g., to act as a distribution client) and in the client 110. The invention software staggers the client reconnect attempt requests over time to prevent the server 108 from being overwhelmed by thousands of simultaneous reconnect requests. The reconnecting client 110 is authenticated and authorized if corresponding security is enabled. The reconnecting client 110 resumes at the same point of a seekable on-demand playlist element. In one embodiment, the server 108 maintains a client viewer state if data has actually been streamed. This check increases the difficulty of developing a denial of service attack. A disconnection resulting from a client inactivity timeout on the server 108 does not result in an error immediately displayed on the client 110. Instead, the client 110 attempts to re-open the file at the beginning of the playlist once play is pressed. In one embodiment, a seek is not possible because the client viewer state on the server 108 for the previous connection will no longer be present. In embodiments lacking a client viewer state present on the server 108, seeking to the previous playlist entry element in a server-side playlist may be disabled. An error displays on the client 110 if the re-open attempt is unsuccessful.

In one embodiment, the invention software does not attempt to automatically reconnect when an administrator for the server 108 terminates a connection, when the server 108 denies access due to an authentication failure, when playing content from a web server, or when the server 108 denies access due to an authorization failure.

In operation, client 110 and server 108 computers such as computer 130 execute computer-executable instructions such as those illustrated in FIG. 2 and FIGS. 4-6 to re-establish a streaming media connection between the server 108 and the client 110. The server 108 streams the media content to the client 110. The client 110 receives the streamed media content from the server 108. If the streaming is interrupted, the client 110 sends a reconnect request to the server 108. The server 108 receives the reconnect request from the client 110. The server 108 and the client 110 re-establish the streaming media connection. Re-establishing includes the server 108 mapping a reconnecting client 110 with a state maintained by the server 108. Alternatively, re-establishing includes creating a new session for streaming if no maintained state corresponds to the client 110. The server 108 continues streaming the media content to the client 110 over the re-established streaming media connection.

Client Component Software

Figure 2:
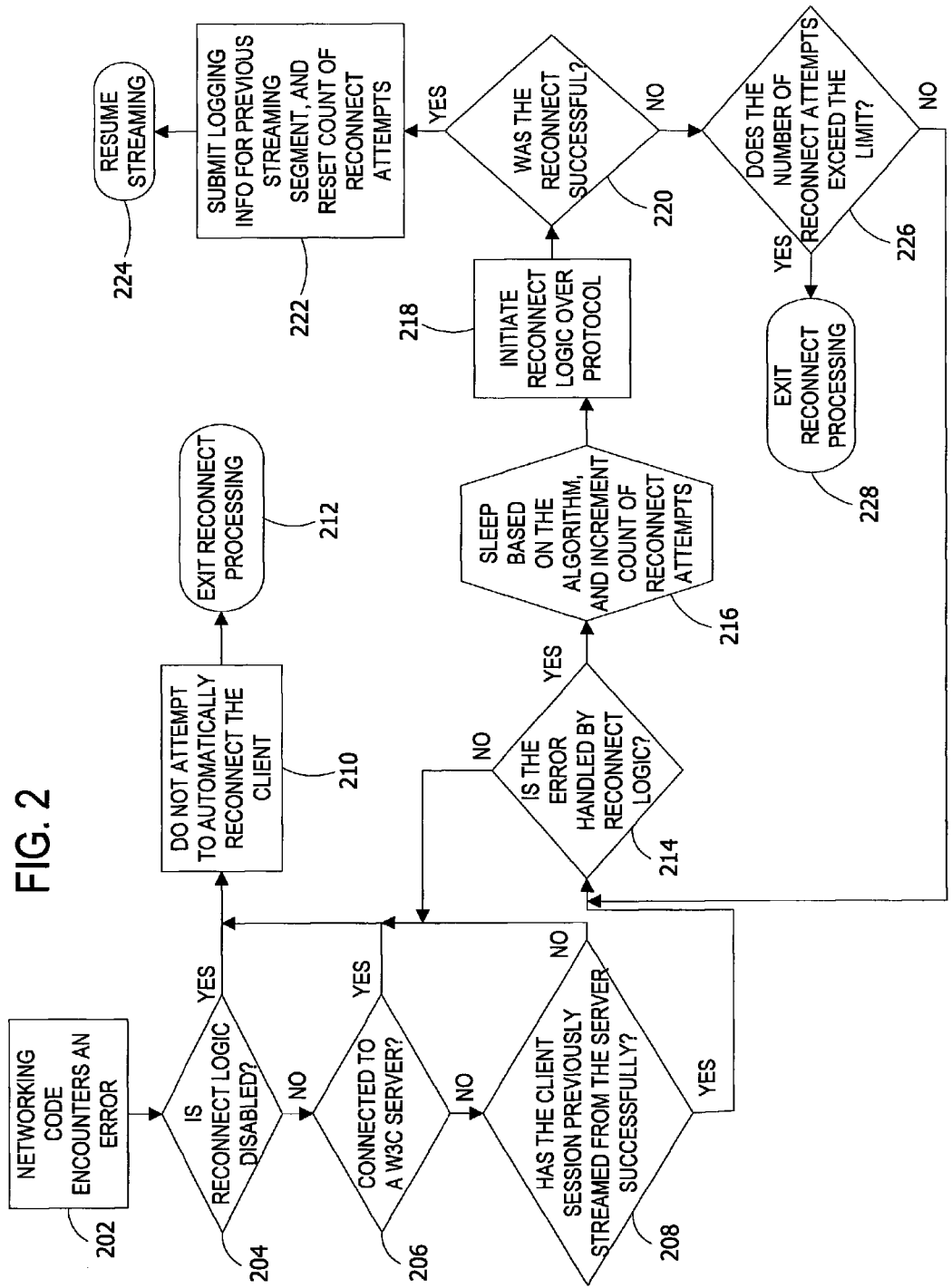
FIG. 2 is an exemplary flow chart illustrating operation of client component autoreconnect software of the invention.

Referring next to FIG. 2, an exemplary flow chart illustrates operation of client component autoreconnect software 114 the invention. The client component software 114 acts upon unexpected errors at 202 that are not the direct action of an administrator. The client component software 114 operates if the client 110 has successfully streamed from the server 108 previously at 208 and the error is handled by reconnect logic 114 at 214.

If thousands of clients 110 attempt to auto-reconnect at exactly the same time, the server 108 may not be able to process any of them successfully. Also, repeated reconnect attempts can tax the client's processor. Therefore, the software of the invention spreads out the timing of the auto-reconnect requests by clients 110. To prevent all clients 110 from overwhelming a streaming media server 108 with a flood of reconnect requests at exactly the same time, the client 110 employs software to sleep at 216 between reconnect attempts. The sleep duration involves a random component to help spread reconnect requests when multiple clients 110 are disconnected at the same time. The sleep software is also used to minimize the amount of client processing required to successfully reconnect. For example, if a client 110 continuously reconnects while waiting for a router to reboot, it could adversely affect the client processor load. By delaying the transmission of the reconnect request to the server 108 for a preset time period between reconnect attempts, both the client 110 and the server 108 are optimized. For example, the client software may wait for five seconds between failed reconnect attempts and increment a reconnect counter for each attempt. In one embodiment, the client 110 attempts to reconnect twenty-five times before halting. That is, if the reconnect counter exceeds a preset threshold at 226, the client software halts the reconnect attempt and logs an error at 228.

The number of attempts the client 110 retries to connect is fully configurable through a client application programming interface (API) and also a uniform resource locator (URL) modifier. A URL modifier allows a content provider or other encoder such as encoder 102 to control the number of reconnect attempts made by the client 110 so that it is appropriate for the environment. An example of the URL modifier follows.

mms://server/file.asf?WMReconnect=15

In this example, the client 110 will attempt to reconnect fifteen times (e.g., at 218) before failing with an error. If the client software successfully reconnects with the server 108 at 220, logging statistics are sent to the server 108, the reconnect counter is reset to zero at 222, and streaming resumes at 224.

There are several mechanisms that trigger the client 110 to attempt a reconnect. A network error detected from the local protocol stack or the error signal sent by the server 108 or prolonged no data period (e.g., a starvation timeout) will potentially trigger the reconnect logic 114. If the error signal sent by the server 108 denotes that the server 108 intended to disconnect the client 110 deliberately, the client 110 will not attempt to reconnect. The client 110 will attempt to reconnect even in a paused state in order to maintain the client viewer status active at the server 108. The player code fires events to update the status of the player user interface to indicate when the client 110 has started (and finished) reconnecting.

The client 110 does not attempt to automatically reconnect with the server 108 under various conditions such as when the client component 114 and/or the server component 112 is disabled at 204. In one embodiment, the client 110 does not attempt to automatically reconnect with the server 108 when the server 108 is a World Wide Web Consortium server at 206. Under such conditions, the client 110 and the server 108 do not automatically reconnect at 210 and reconnect processing exits at 212.

In a server distribution or a cache/proxy scenario where one server is receiving content from the origin server 104, the downstream server 106 is essentially a client such as client 110 in that it is streaming content from the origin server 104. In this scenario, the downstream server 106 can employ autoreconnect software to connect back to the origin server 104 using software similar to the software 114 used by the client 110.

Figure 3:
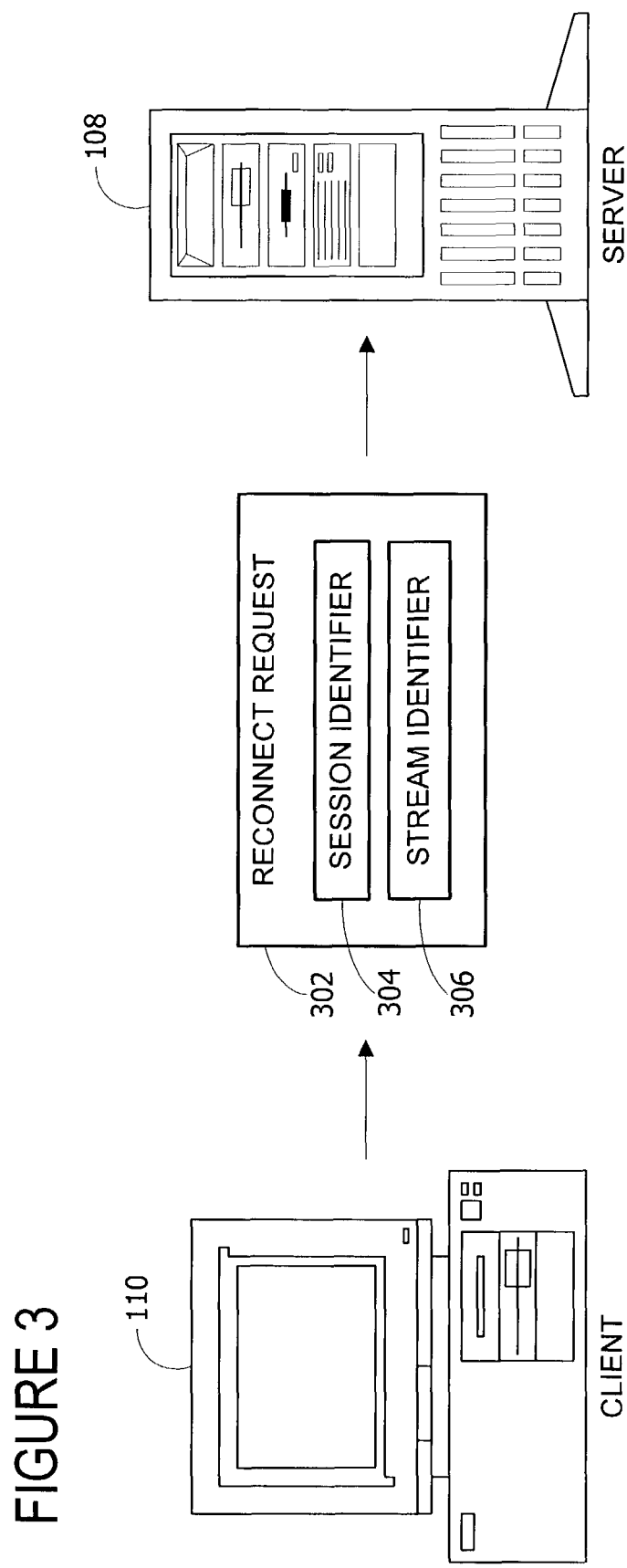
FIG. 3 is an exemplary block diagram illustrating a client sending a reconnect request to a server.

Referring next to FIG. 3, an exemplary block diagram illustrates the client 110 sending a reconnect request 302 to the server 108 to re-establish an interrupted streaming media session. In the exemplary embodiment of FIG. 3, the reconnect request 302 is a data structure including a stream identifier 306 and a session identifier 304. The session identifier identifies the interrupted streaming media session. For example, the session identifier may be a 64-bit or a 32-bit value generated by the server 108 and identifies the client-server relationship. The stream identifier identifies a media stream streamed by the server 108 to the client 110 in the interrupted streaming media session. For example, the stream identifier may be a 32-bit value generated by the server 108 to identify a particular stream in the media content.

Server Component Software

Figure 4:
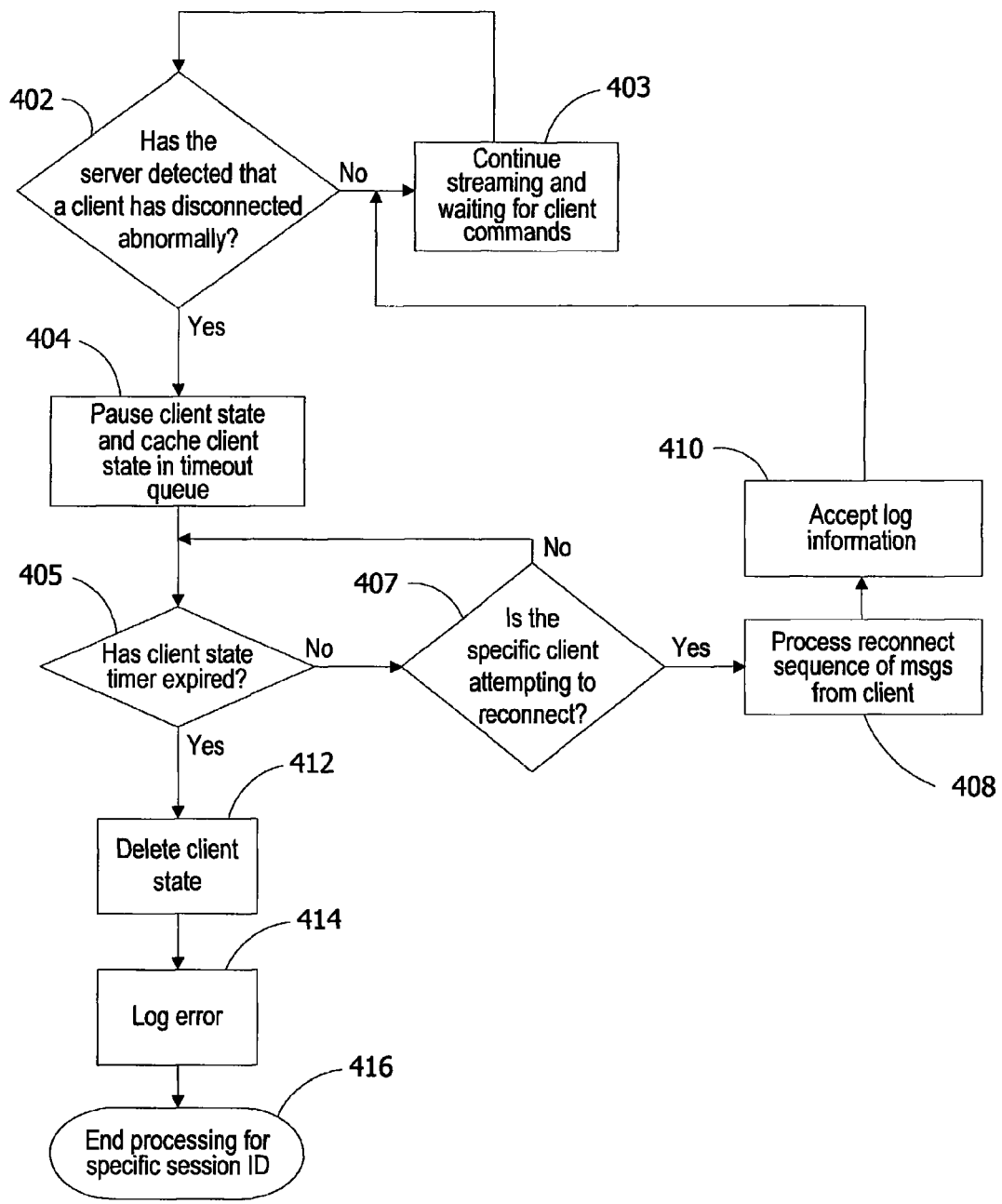
FIG. 4 is an exemplary flow chart illustrating operation of server component autoreconnect software of the invention.

Referring next to FIG. 4, an exemplary flow chart illustrates operation of the server component autoreconnect software 112 of the invention. During the period in which the server 108 does not detect at 402 that the client 110 has disconnected abnormally, the server 108 continues streaming at 403 and waiting for commands from the client 110. If the server 108 detects at 402 that the client 110 has disconnected abnormally, the server 108 employs a variety of mechanisms to allow the client 110 to reconnect. These mechanisms are described below.

The client 110 periodically transmits state data (e.g., logging statistics) to the server 108 for storage. In addition, the server 108 tracks the status of each client viewer state and allows an administrator of server 108 to determine the state of any client 110. The state data includes a session identifier and a stream identifier corresponding to the current client-server session and the streams being delivered, respectively. The server 108 pauses the client state and maintains the client viewer state for a pre-determined (e.g. configurable) duration or time period at 404. The client viewer state may be stored or cached in the state repository, a timeout queue, or the like. Since the client viewer state consumes server resources, the server 108 will not maintain the state indefinitely. After determining that the configurable duration expired at 405, the server 108 removes the client viewer state at 412, frees the associated resources, logs an error at 414, and ends processing at 416 for the current session. For example, logging an error at 414 includes the server 108 generating a log on behalf of the client 110 because the reconnecting client 110 will not submit a log (e.g., with status code 210) for content rendered before the reconnect event.

If the client 110 attempts to re-connect or otherwise re-establish a connection while the client viewer state is present on the server 108 at 405, the client 110 end-user experience is optimal. If the server 108 determines at 407 that the client 110 attempting to reconnect is associated with a cached client state, the server 108 processes at 408 the reconnect sequence of messages from the client 110.

The server 108 accepts logging information at 410 from the previous session from the clients 110 that re-connect. For example, a client such as client 110 that streams content for one hour loses its connection to the server 108 prior to successfully submitting logging information. Through the invention software, the client 110 reestablishes the connection back to the server 108 and submits the logging information for the previous segment in addition to continuing with the streaming process. Logging information is data that describes the characteristics of the client 110 and the rendering information associated with the streaming session. Logging information includes, but is not limited to, packet loss statistics and frame rate rendered. See Appendix C for an exemplary list and discussion of logging statistics.

For example, if the client viewer state is available at the server 108 by the time the client 110 recovers the connection, and if the client 110 is reconnecting in streaming status, the client 110 will submit a log with status code 210. Apart from the status code, the content of the log is the same as a regular log sent after playback. If the preset time period has elapsed, the server component 112 deletes the client viewer state. After accepting the log from the client 110 at 410, the server 108 resumes streaming at 403.

If the disconnection was the specific intention of the server 108 and not due to an unforeseen fault, the server 108 will inform the client 110 before disconnecting so that the client 110 does not try to reconnect unnecessarily. An example of this might be when an administrator for server 108 terminates a broadcast program normally. If the specific client viewer state was for the content which requires authentication, the server 108 will re-challenge the reconnecting client 110.

Figure 5:
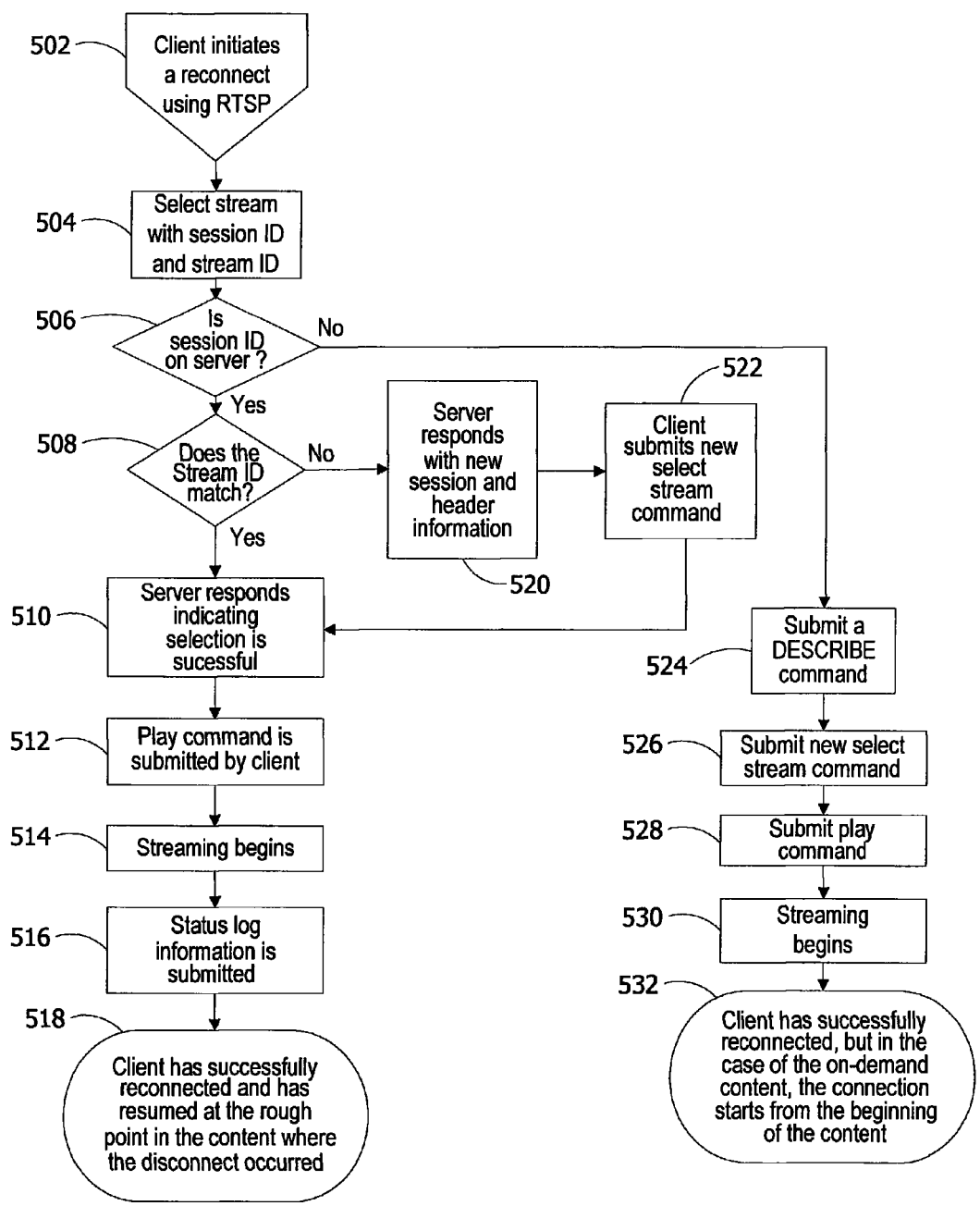
FIG. 5 is an exemplary flow chart illustrating the interaction between the client and the server during reconnection via a real-time streaming protocol.

Referring next to FIG. 5, an exemplary flow chart illustrates the interaction between the client 110 and the server 108 during reconnection via a real-time streaming protocol. In the embodiment illustrated in FIG. 5, the software of the invention is implemented with RTSP. If an RTSP client such as client 110 is attempting to reconnect at 502 in streaming status, the RTSP client 110 sends at 504 multiple SETUP messages (e.g., reconnect requests 302 with the session identifier 304 and the stream identifier 306) for SelectStreams to re-configure the data ports and stream parameters. If there is an RTSP proxy, some of the parameters may get reset. Attempting to re-establish the session includes the server 108 searching for the received session identifier in the state repository. If the received session identifier is found at 506 within the state repository, the server 108 searches at 508 for the received stream identifier within the state repository. If SelectStreams succeeds (e.g., the session identifier and stream identifier are found within the state repository), the server responds at 510 indicating that the selection was successful. In addition, the client 110 sends a PLAY command at 512 to restart streaming at 514. If the original viewer state could be retrieved, the client 110 sends a log message at 516 (e.g., with a status of 210) to report the play status before reconnect after the PLAY command completes. The streaming resumes at 518 at the approximate point in the content where the disconnect or other error occurred.

If the received stream identifier is not found within the state repository, the server 108 transmits at 520 one or more other stream identifiers to the client 110 for selection by the client 110. The other stream identifiers include the stream identifiers for any content available from the server 108, including the streams that may have been streaming during the failed session. The client 110 transmits at 522 a playback request to the server 108 where the playback request specifies at least one of the other stream identifiers. The server 108 then streams the media content associated with the stream identifiers selected by the client 110.

If the server 108 does not have the viewer state for the requested session at 506 (e.g., the session identifier is not in the state repository), the server 108 responds with an error to indicate the session was lost. In this case, the client 110 attempts to re-establish the connection by submitting a DESCRIBE command at 524 to retrieve the most recent streaming description and then submits a SelectStream command at 526 and a Play command at 528 based on the new description. If the viewer status is available at the server 108 but the streaming description that the client 110 retrieved before being disconnected is no longer current, the server 108 pushes the most recent information of the requested URL by submitting Announce right after accepting Play. If an RTSP client 110 is reconnecting in paused status, it sends Select-Streams to re-configure data ports and stream parameters. The client 110 sends periodic GET_PARAMETERs for KeepAlives to keep the viewer state active until the user wants to play again. The command SelectStream may fail if the requested session on the server 108 was gone, in which case client 110 will submit DESCRIBE and retrieve the most recent streaming description. In this specific example, there will be no 210 log message report after reconnect. When streaming begins at 530, the client 110 has successfully reconnected. In the case of on-demand content, the streaming starts from the beginning of the content.

Figure 6:
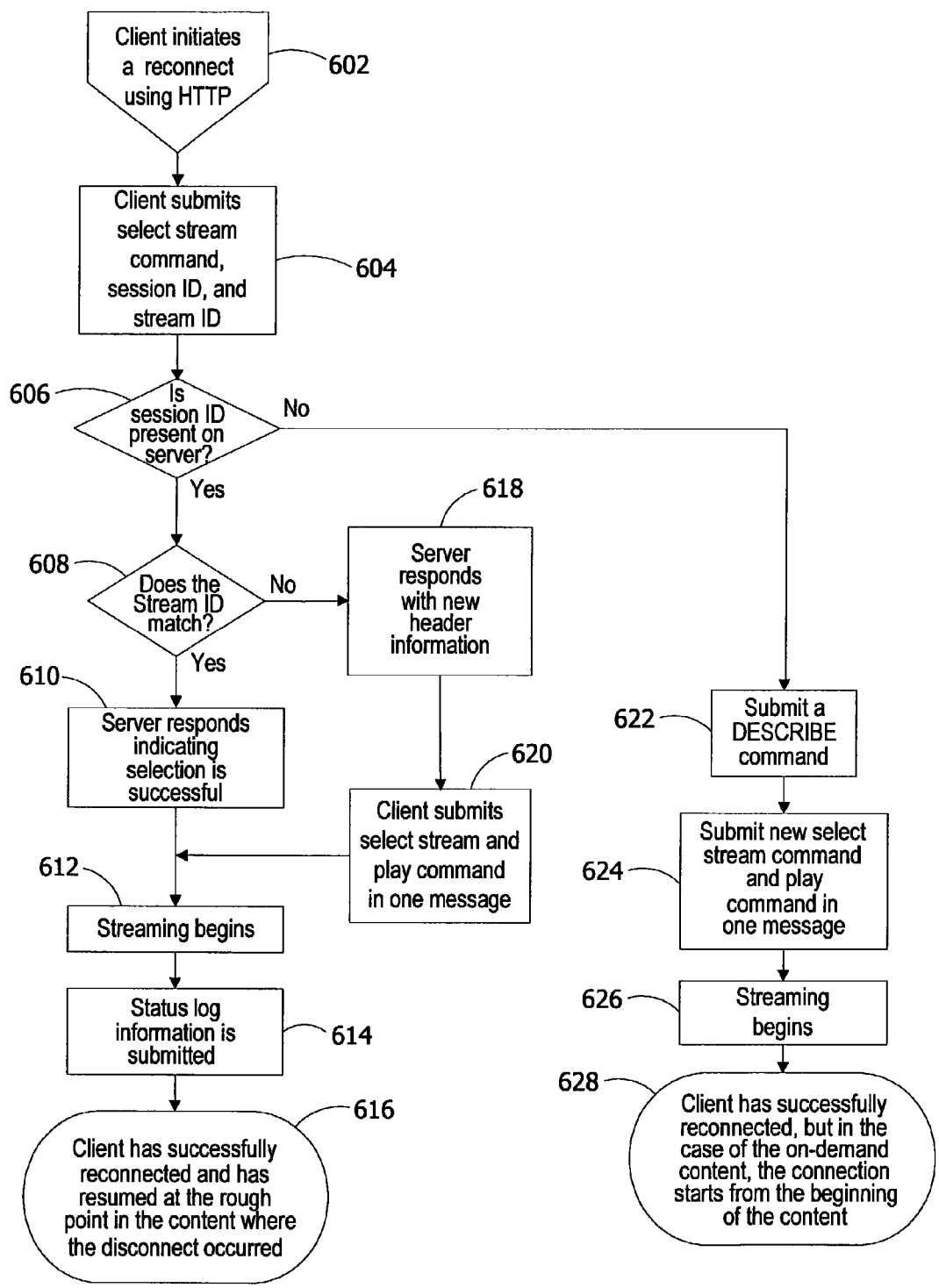
FIG. 6 is an exemplary flow chart illustrating the interaction between the client and the server during reconnection via a hypertext transfer protocol.

Referring next to FIG. 6, an exemplary flow chart illustrates the interaction between the client 110 and the server 108 during reconnection via a hypertext transfer protocol. The flow in FIG. 6 is generally similar to that described in FIG. 5. In the embodiment illustrated in FIG. 6, the software of the invention is implemented in HTTP. If an HTTP client such as client 110 is attempting to reconnect at 602 in streaming status, the client 110 sends one GET command at 604 that contains both SelectStreams and Play information along with the session identifier 304 and the stream identifier 306. The server 108 attempts to associate the maintained client viewer state with the client 110 sending the reconnect request 302. If the server 108 determines that the original viewer state on the server 108 still exists (i.e., the session identifier 304 is present on the server 108 at 606 and the stream identifier 306 is present on the server 108 at 608), the server 108 responds to the client 110 indicating that the selection was successful at 610. Streaming begins at 612. The client 110 sends a log message at 614 (e.g., with a 210 status code) to report the play status before the reconnect event. Whether the requested viewer state is available or not, the server 108 does not return an error as in the RTSP implementation. If the requested viewer state is not available, the server 108 handles the request 302 based on the most recent streaming description of the requested URL. The server 108 includes the most recent streaming description and the viewer state information in the response so that the client 110 can detect the current status of the server 108. That is, the server 108 responds with new header information at 618. The client 110 submits a select stream and play command in one message at 620 and streaming begins at 612.

If the HTTP client 110 is reconnecting in a paused status, the client 110 sends OPTIONS for KeepAlives to keep the viewer state active until the user wants to play again. In this exemplary implementation, there are no log messages (e.g., with a status code of 210) reported after reconnect.

If the client viewer state is in the state repository accessible by the server 108, the client 110 attempts to automatically reconnect to the same session when the connection is reestablished, as shown in the network trace listed in Appendix A.

When a client 110 attempts to automatically reconnect to the same session after a network outage, the session may have expired at 606. In this case, the client 110 makes a new attempt to connect, this time without including the session identifier. That is, the client 110 submits a DESCRIBE command at 622. The server 108 creates a new session and returns the identifier, as shown in the network trace listed in Appendix B. The client 110 submits a new select stream command and play command in one message at 624 and streaming begins at 626. The client 110 has successfully reconnected at 628. In the case of on-demand content, the streaming starts from the beginning of the content.

Errors Handled by Auto-Reconnect Software

Errors handled by the auto-reconnect software include, but are not limited to, the following errors. If any of the errors listed below initially occur, the reconnect software will be triggered:
   ERROR_CONNECTION_ABORTED
   ERROR_NETNAME_DELETED
   ERROR_CONNECTION_INVALID
   NS_E_TIMEOUT
   NS_E_PROXY_TIMEOUT
   NS_E_NOCONNECTION
   NS_E_NET_READ
   NS_E_CONNECTION_FAILURE
   WSAECONNRESET
   WSAECONNABORTED
   WSAENETUNREACH
   WSAENETDOWN If any of the errors below occur during a reconnect attempt, the reconnect software is repeated (assuming the maximum number of attempts has not been reached):
   ERROR_OPERATION_ABORTED
   ERROR_NETWORK_UNREACHABLE
   ERROR_HOST_UNREACHABLE
   ERROR_PROTOCOL_UNREACHABLE
   NS_E_SERVER_DNS_TIMEOUT
   NS_E_PROXY_DNS_TIMEOUT
   NS_E_SERVER_NOT_FOUND
   NS_E_PROXY_NOT_FOUND
   NS_E_CANNOTCONNECT
   NS_E_CANNOT_CONNECT_TO_PROXY
   WSAEHOSTUNREACH
   WSAETIMEDOUT The auto-reconnect software 112, 114 is not invoked for a variety of other errors. The list of errors or conditions that do not result in a reconnect attempt against the server 108 includes, but is not limited to, a publishing point limit is reached, the client 110 fails authentication, the title is not found, the server 108 or publishing point is denying new connections, the publishing point is stopped, the server 108 does not initially respond in time, the administrator for the server 108 terminates the client 110, the server 108 inactivity timeout feature disconnects the player, the reconnect software is disabled, and the server 108 is a World Wide Web Consortium server.

Logging During an Auto-Reconnect

Logging statistics are used by content distribution networks (CDNs) to bill customers. As a result, accurate logging statistics are critically important for the CDNs to maximize their revenue opportunities. See Appendix C for an exemplary list and discussion of logging statistics. A complete log entry (e.g., defined by the status code 200 or 210) reflects what the client 110 actually rendered. There are several possible cases that may occur during the streaming of media such as described in the following examples. Those skilled in the art will note that the status codes are merely exemplary, and do not limit the logging aspects of the invention in any way.

The content may be streamed successfully without the loss of the connection between the server 108 and the client 110. In this case, the auto-reconnect software is not used and a normal log entry is written.

In another scenario, a server-client connection or a distribution connection may be temporarily lost for a short period of time, but then automatically re-established. In this case, two log entries are written. One log entry contains the information regarding the content received and played by the client 110 prior to the disconnect event. For example, this log entry has a status code of 210. The client 110 information for this log entry is submitted during the handshake for the reconnect request 302. Another log entry occurs following the successful completion of the content. This log entry includes information for the duration of the clip streamed immediately after the reconnect occurred. For example, this log entry has a normal status code of 200.

In another example, the server-client connection or the distribution connection may be lost and auto-reconnect software 112, 114 is either disabled or unable to reconnect within the allotted number of attempts. This situation results in one log entry with the status code of 408. The entry includes information regarding the segment of content played prior to the disruption.

Distribution Outages and Client Buffering

In an alternate scenario of the invention, during a distribution outage, the clients 110 do not receive any streamed data. As a result, the starvation timer on the clients 110 may eventually fire and ultimately result in all the clients 110 attempting to reconnect to the server 108. This situation is undesirable because it greatly increases the load on the server 108 and lengthens the time required for the clients 110 to recover from the outage. To preclude this situation, software of the invention operating on the server 108 fakes a stream switch that places the clients 110 in a waiting state to prevent starvation during a distribution outage. When the distribution connection recovers, the server software 112 sends another stream header before streaming the content. This mechanism allows the clients 110 to resume playing.

Configurable Settings

In one embodiment, the server 108 namespace is used to configure the duration a client state is maintained on the server 108 after an abnormal disconnect. The following exemplary namespace parameters tune these timeout values.

"ClientIdTimeoutForPlayer"—(60 sec default)
"ClientIdTimeoutForPull" (60 sec default—distribution connections)
"ClientIdTimeoutForPush" (300 sec default—encoder connections)

Additionally, the software exposes a property (e.g., AutoReconnectLimit). A value of zero disables the auto-reconnect logic 114. A value of (−1) results in autoreconnect software attempting to reconnect forever. In addition, the client software 114 fires events such as WMT_RECONNECT_START and WMT_RECONNECT_END, during the reconnect process. This information is available to the higher level player application for display in the UI.

Client Options

The client software exposes an object model property (e.g., AutoReconnect). The object model property is adjustable from the default player UI. In one embodiment, the default value for this property is three. A value of zero disables the auto-reconnect software and a value of (−1) results in auto-reconnect software attempting to reconnect forever. In addition, the player UI processes events such as WMT_RECONNECT_START and WMT_RECONNECT_END during the reconnect process. This information is then displayed in the player UI.

Exemplary Operating Environment

Figure 7:
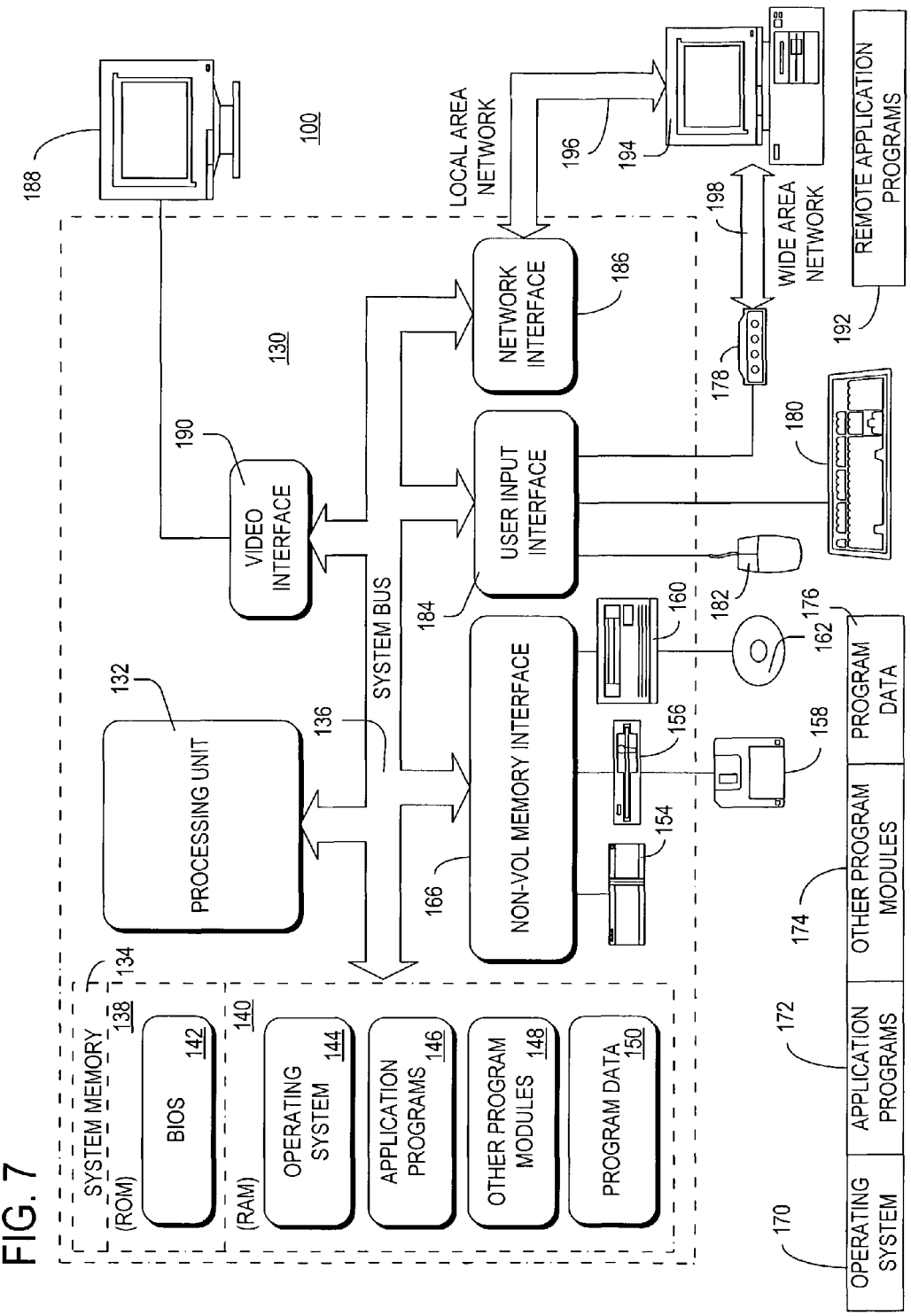
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or mites to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The following scenarios illustrate operation of the software of the invention.

On-Demand Content

In a server 108 to client 110 network interruption scenario, one or more clients such as clients 110 viewing on-demand content have their network connection interrupted. Automatic reconnect logic 112, 114 minimizes the impact to each viewer affected by the temporary network outage. The reconnect logic 112, 114 allows the client 110 to restart at the point the connection was lost by seeking to that point in the file upon successfully reconnecting to the server 108. If the content is not seekable, the program element shall be restarted at the beginning.

In a source to server network interruption scenario, all clients 110 that are streaming on-demand content obtained from another location by the edge server 108 will be affected. Automatic reconnect logic 112, 114 minimizes the impact to all viewers affected by the temporary network outage. The reconnect logic 112, 114 allows the client 110 to restart at the point the connection was lost by seeking to that point in the file upon successfully reconnecting to the server 108. If the content is not seekable, the program element shall be restarted at the beginning.

Broadcast Content

A source to server network interruption scenario is routinely encountered by large CDNs. In this scenario, all clients 110 that are streaming content obtained from another location by the edge server 108 are affected. If the source content is live, the customer may experience a gap in the program even when automatic reconnect logic 112, 114 is successful. However, automatic reconnect logic 112, 114 minimizes the impact to all viewers affected by the temporary network outage.

In a server 108 to client 110 network interruption scenario, one or more clients such as clients 110 viewing broadcast content have their network connection interrupted. Due to the nature of a broadcast, the customer experiences a gap in the program even when automatic reconnect logic 112, 114 is successful. However, automatic reconnect logic 112, 114 minimizes the impact to the specific viewer(s) affected by the temporary network outage.

The following examples illustrate specific embodiments of the invention.

Content Distribution Network Scenario

Some CDNs have complicated distribution scenarios involving combinations of origin and distribution servers such as server 108 using the Internet for some of their distribution feeds. When temporary problems on the Internet result in the distribution connection being severed, all downstream clients 110 that are streaming the content are disconnected. This results in the loss of thousands of clients 110 (and subsequent lost revenue opportunities often dependent upon on successful usage logging statistics) when a network feed is temporarily interrupted.

The automatic client reconnection software reduces the scenarios where clients 110 are dropped due to distribution network interruptions. For example, some platforms shall support a temporary distribution network outage of at least 90 seconds before clients 110 are terminated by the servers 108 downstream from the distribution network interruption. Furthermore, assuming the reconnection attempt is successful, the logging usage information for clients 110 is complete. Lost revenue due to network problems will be reduced.

Listening to an Internet Radio Station all Day

In one example, a user loves to listen to an Internet sports radio station all day at work while working on a computer. Unfortunately, the LAN is notoriously unreliable (e.g., routers are often rebooted). In addition, the firewall often times out TCP connections and resets them. The ISP is also unreliable. Network interruptions often exceed 10 seconds. As a result, the user often gets disconnected from the Internet radio station server, and an annoying dialog pops up forcing a manual reconnect. Sometimes, the user has to try a few times before reconnecting back to the Internet radio.

The automatic reconnect software of the invention addresses the problem the user is currently experiencing. The player employs software to attempt to reconnect multiple times before popping up an error dialog. A configuration option in the player allows the user to set the number of attempts. With the invention, the user is able to leave the player running indefinitely.

Movie Scenario

In another example, the user recently subscribed to a video-on-demand trial in an assisted-living apartment. The user typically watches 2-4 action movies per week with friends. When the user orders a new movie, the CDN precedes the start of the movie with trailers for other action movies that the user might be interested in. Because the CDN mixes and matches these trailers with other customers, the trailers are separate files (e.g., advanced streaming format files). The trailers and movie are tied together sequentially by using a server-side playlist dynamically generated in response to the movie order.

The user has a cable modem connection that is susceptible to occasional temporary outages. Sometimes, while watching movies, the temporary network outage causes the TCP connection to be reset or the starvation timer on the client 110 to fire. With the reconnect software of the invention, the user only experiences a pause in the playback of the movie. The user's player does not display an error requiring user intervention. The user does not lose the connection or the location in the server-side playlist. As such, the user does not need to search through a server-side playlist or view error messages. The user simply views the movie without noticing any of the network outages.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of streaming media content to at least one client, said method comprising:

establishing a streaming media connection between an origin server and the at least one client, wherein the streaming media originates at the origin server;

associating a session identifier corresponding to the current client-server session and a stream identifier corresponding to a particular stream being delivered with the established streaming media connection, wherein the session identifier is a value identifying a relationship between the origin server and the at least one client, and wherein the stream identifier is a value identifying a particular stream in the media content;

streaming the media content from the origin server to the client;

maintaining a state of the client within a state repository at the origin server, wherein the state of the client includes the session identifier and the stream identifier, wherein maintaining the state of the client within the state repository at the origin server comprises maintaining the state for a preset time period after the streaming media content is interrupted;

receiving a reconnect request, at the origin server, when said streaming media content is interrupted, said reconnect request including the session identifier and the stream identifier;

in response to receiving the reconnect request, retrieving, by the origin server, the maintained state based on the session identifier and the stream identifier in the received request;

based upon the retrieved state, re-establishing, by the origin server, the streaming media connection with the client, wherein the streaming media connection is between the same origin server and the client, and wherein re-establishing comprises associating the maintained state with the client sending the reconnect request to the origin server; and continuing, based on the retrieved state, the streaming of the media content from the origin server to the client.

2. The method of claim 1, wherein said sending comprises sending a reconnect request having a stream identifier and a session identifier.

3. The method of claim 1, wherein said streaming comprises streaming the media content to the client from a file system accessible by the server.

4. The method of claim 1, wherein said streaming comprises streaming, by the server, the media content to the client from another server.

5. The method of claim 1, further comprising transmitting state information from the client to the server.

6. The method of claim 1, wherein said streaming comprises streaming the media content from the server to the client via a real-time streaming protocol.

7. The method of claim 1, wherein said streaming comprises streaming the media content from the server to the client via a hypertext transfer protocol.

8. A method of streaming media content to a client, said method comprising:

establishing, by an origin server, a streaming media connection between the client and the origin server, wherein the streaming media originates at the origin server;

associating a session identifier corresponding to the current client-server session and a stream identifier corresponding to a particular stream being delivered with the established streaming media connection;

streaming the media content from the origin server to the client;

maintaining a state of the client within a state repository at the origin server until a predetermined condition is met, wherein the state of the client within the state repository at the origin server includes the session identifier and the stream identifier of the streaming media content and wherein the state of the client within the state repository at the origin server is deleted when the predetermined condition is met;

receiving, at the origin server, a reconnect request when said streaming media content is interrupted, said reconnect request including the session identifier and the stream identifier;

in response to receiving the reconnect request, retrieving, by the origin server, the maintained state based on the session identifier;

re-establishing the streaming media connection between the client and the origin server based on the retrieved state, wherein the streaming media connection is between the same origin server and the client, wherein re-establishing comprises associating the maintained state with the client sending the reconnect request to the origin server; and continuing the streaming of the media content from the origin server to the client.

9. The method of claim 8, wherein the predetermined condition is a preset time period after said streaming is interrupted.

10. The method of claim 8, wherein said maintaining further comprises logging an error.

11. The method of claim 5, wherein one or more computer-readable media have computer-executable instructions for performing the method of claim 5.

12. The method of claim 5, wherein said streaming comprises maintaining a state of the client in a state repository, and wherein said re-establishing comprises searching for the received session identifier in the state repository.

13. The method of claim 12, wherein if the received session identifier is not found within the state repository, said re-establishing further comprises establishing another streaming media connection with the client, and said continuing comprises streaming the media content associated with the received stream identifier to the client.

14. The method of claim 12, wherein if the received session identifier is found within the state repository, said re-establishing further comprises searching for the received stream identifier within the state repository.

15. The method of claim 14, wherein if the stream identifier is found within the state repository, said continuing comprises streaming the media content associated with the received stream identifier to the client.

16. The method of claim 14, wherein if the received stream identifier is not found within the state repository, said re-establishing further comprises transmitting one or more other stream identifiers to the client for selection by the client.

17. The method of claim1 16, wherein said re-establishing further comprises receiving a playback request from the client in response to said transmitting, said playback request comprising at least one of the other stream identifiers.

18. The method of claim 17, wherein said continuing comprises streaming the media content associated with the received at least one of the other stream identifiers.

* * * * *